United States Patent
Mariani

(10) Patent No.: US 7,493,604 B2
(45) Date of Patent: Feb. 17, 2009

(54) CONDITIONAL COMPILATION OF INTERMEDIATE LANGUAGE CODE BASED ON CURRENT ENVIRONMENT

(75) Inventor: Rico Mariani, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 557 days.

(21) Appl. No.: 10/970,423

(22) Filed: Oct. 21, 2004

(65) Prior Publication Data

US 2006/0101438 A1 May 11, 2006

(51) Int. Cl.
*G06F 9/45* (2006.01)
*G06F 9/44* (2006.01)

(52) U.S. Cl. ............... 717/148; 717/106; 717/153; 717/160

(58) Field of Classification Search ......... 717/124–161, 717/106
See application file for complete search history.

(56) References Cited

U.S. PATENT DOCUMENTS

| | | | | |
|---|---|---|---|---|
| 5,450,585 | A * | 9/1995 | Johnson | 717/156 |
| 5,692,196 | A * | 11/1997 | Unni et al. | 717/145 |
| 6,295,642 | B1 * | 9/2001 | Blandy | 717/148 |
| 6,308,319 | B1 * | 10/2001 | Bush et al. | 717/141 |
| 6,324,686 | B1 * | 11/2001 | Komatsu et al. | 717/148 |
| 6,851,108 | B1 * | 2/2005 | Syme et al. | 717/146 |
| 7,171,655 | B2 * | 1/2007 | Gordon et al. | 717/148 |
| 2003/0070161 | A1 * | 4/2003 | Wong et al. | 717/148 |
| 2004/0210876 | A1 * | 10/2004 | Stall et al. | 717/127 |
| 2005/0015753 | A1 * | 1/2005 | Meijer et al. | 717/136 |
| 2005/0114848 | A1 * | 5/2005 | Choi et al. | 717/148 |
| 2006/0158354 | A1 * | 7/2006 | Aberg et al. | 341/50 |

OTHER PUBLICATIONS

August et al., Architectural support for compiler-synthesized dynamic branch prediction strategies: Rationale and intial results, IEEE, Feb. 1997, pp. 84-93.*
Some et al., Parsing minimization when extracting information from code in the presence of conditional compilation, IEEE, Jun. 1998, pp. 118-125.*
Edwards, Compiling Esterel into sequential code, IEEE, 1999, pp. 147-151.*
Ying Hu et l., C/C++ conditional compilation analysis using symbolic execution, IEEE, 2000, pp. 196-206.*
Seong-Uk Choi et al., Eliminating conditional branches for enhancing instruction level parallelism in VLIW compiler, IEEE, ☐☐ Jun. 12-14, 1996, pp. 193-199.*
Lu et al., Compiler optimization of implicit reductions for distributed memory multiprocessors, IEEE, Mar. 30-Apr. 3, 1998, pp. 42-45.*
Garrido et al., Refactoring C with conditional compilation, IEEE, Oct. 6-10, 2003, pp. 323-326.*

* cited by examiner

*Primary Examiner*—Wei Y. Zhen
*Assistant Examiner*—Satish S Rampuria
(74) *Attorney, Agent, or Firm*—Lee & Hayes, PLLC

(57) ABSTRACT

Conditional compilation of intermediate language code based on current environment includes loading intermediate language code on a device. Portions of the intermediate language code are conditionally just-in-time compiled based on a current environment of the device. In accordance with certain aspects, intermediate language code is loaded on a device and a current environment of the device is identified. The intermediate language code is modified based on the current environment, and portions of the modified intermediate language code are just-in-time compiled as needed when running the intermediate language code.

33 Claims, 3 Drawing Sheets

CONDITIONAL COMPILATION OF INTERMEDIATE LANGUAGE CODE BASED ON CURRENT ENVIRONMENT

TECHNICAL FIELD

This invention relates to computer programming and compiling, and particularly to conditional compilation of intermediate language code based on current environment.

BACKGROUND

A computer program is typically written in a high-level language, and this high-level language version of the program is typically referred to as source code. This source code is then transformed into a low-level language, and this low-level language version of the program is typically referred to as object code. The high-level language is typically easier for the program designers and developers to work with, while the low-level language is the language that the processor(s) of the computer running the program understand. This transforming of a higher-level version of the program into a lower-level version of the program is oftentimes referred to as compiling the program. In some situations, the developer compiles the program prior to distribution, so that the end user receives the object code ready to run on his or her computer. In other situations, the developer distributes the program in an intermediate language (IL), which is then compiled at the end user's computer. This compilation at the end user's computer can be performed as the program is run, with functions being compiled as they are needed by the program, which is referred to as just-in-time (JIT) compilation.

Typically, a developer generates a single version of a program, either a compiled object code version or an IL version, and then distributes that same version to all of the end users. This single-version approach is easier on the developer than distributing multiple versions of the program because only a single version need be generated and there is no confusion as to which version an end user has or should have. However, this approach can also be problematic because it does not allow different versions of the program designed to be more useful for different types of end users and/or different uses of the program to be distributed. Thus, it would be beneficial to have a way to maintain much of the ease of distributing a single version of the program, while at the same time allowing programs designed to be more useful for different types of end users and/or different uses of the program to be supported.

SUMMARY

Conditional compilation of intermediate language code based on current environment is discussed herein.

In accordance with certain aspects, intermediate language code is loaded on a device. Portions of the intermediate language code are conditionally just-in-time compiled based on a current environment of the device.

In accordance with certain aspects, intermediate language code is loaded on a device and a current environment of the device is identified. The intermediate language code is modified based on the current environment, and portions of the modified intermediate language code are just-in-time compiled as needed when running the intermediate language code.

BRIEF DESCRIPTION OF THE DRAWINGS

The same numbers are used throughout the document to reference like components and/or features.

DETAILED DESCRIPTION

Conditional compilation of intermediate language code based on current environment is described herein. The intermediate language code is compiled at the computing device where the code will be run. Portions of the intermediate language code are conditionally compiled based on parameters or settings reflecting the current environment of the computing device at the time the intermediate language code is loaded at the computing device for compilation. Based on these parameters or settings, certain portions of the code may or may not be compiled, and/or certain constant values may be set.

Figure 1:
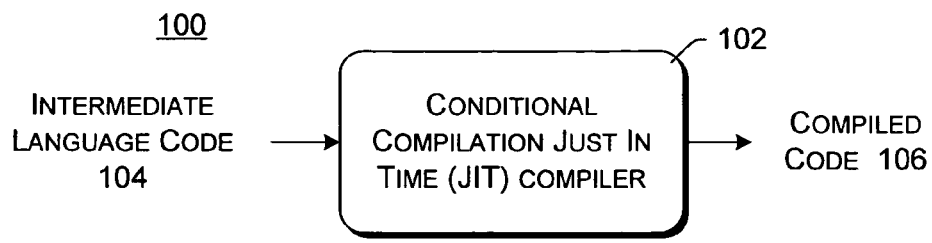
FIG. 1 illustrates an example system including a compiler employing conditional compilation of intermediate language code based on current environment.

FIG. 1 illustrates an example system 100 including a compiler 102 employing the conditional compilation of intermediate language code based on current environment. Generally, programs are written in a high-level programming language, such as Visual Basic, C++, C#, Java™, and so forth. This high-level version, referred to as the source code, is compiled into an intermediate language (IL), typically by the program developer. This IL is then distributed by the program developer to the end users. Compiler 102 can then be employed by the end user to compile the IL version of the program into a low-level language specific to the particular processor on which the code is to be run.

The IL follows certain rules, which allows designers of various programs using various languages to write code that is able to communicate with other designers' code, and access the same underlying library functionality. The rules for the intermediate language serve as a contract among the various code designers. By adhering to the rules, libraries or other code written in one language can be directly accessible to code written in other languages, allowing seamless integration among code written in various languages. An example of such a set of rules is referred to as the common language specification (CLS), available from Microsoft Corporation of Redmond, Wash.

Compiler 102 is a conditional compilation just-in-time (JIT) compiler that compiles an intermediate language (IL) code 104 into compiled code 106. This compilation involves generating a low-level code, typically referred to as object code, which can be executed by a particular processor(s). Different processor architectures, including processors from different manufacturers as well as different models of processors from the same manufacturer, can have differences in their implementation that result in differences in the low-level code that they can execute. Compiler 102 is aware of such architectures and differences, and can generate the proper low-level code for the proper processor(s). Alternatively, rather than a single compiler 102 that can generate different low-level code for different processor architectures, multiple different compilers 102 may be designed with each compiler 102 generating low-level code for a single processor architecture. Typically, a particular system 100 (such as a computing device) would have a single compiler 102, although alternatively a system 100 may include multiple compilers 102.

Compiler 102 is referred to as a just-in-time (JIT) compiler because compiler 102 compiles the IL code as the object code is needed, rather than compiling the entirety of the code prior to the code being run. As the IL code is run, when a portion of the code is encountered that needs to be executed but has not yet been compiled, compiler 102 compiles the needed portion.

Compiler 102 is referred to as a conditional compilation compiler because compiler 102 analyzes IL code 104 for a particular portion of the code encountered during running of the code, and can determine which parts of the portion of the code to compile and/or other modifications to make to that portion prior to compilation. This determination is made based on the current environment in which the code is being run. The current environment refers to parameters or settings of system 100, which can change over time, as discussed in more detail below.

The unit of compilation employed by compiler 102, and thus the boundaries of each portion of IL code, can vary in different embodiments. For example, each function of the IL code may be a portion, instructions in the IL code may be grouped together as modules and each module may be a portion, each object or type defined by the IL code may be a portion, and so forth.

Figure 2:
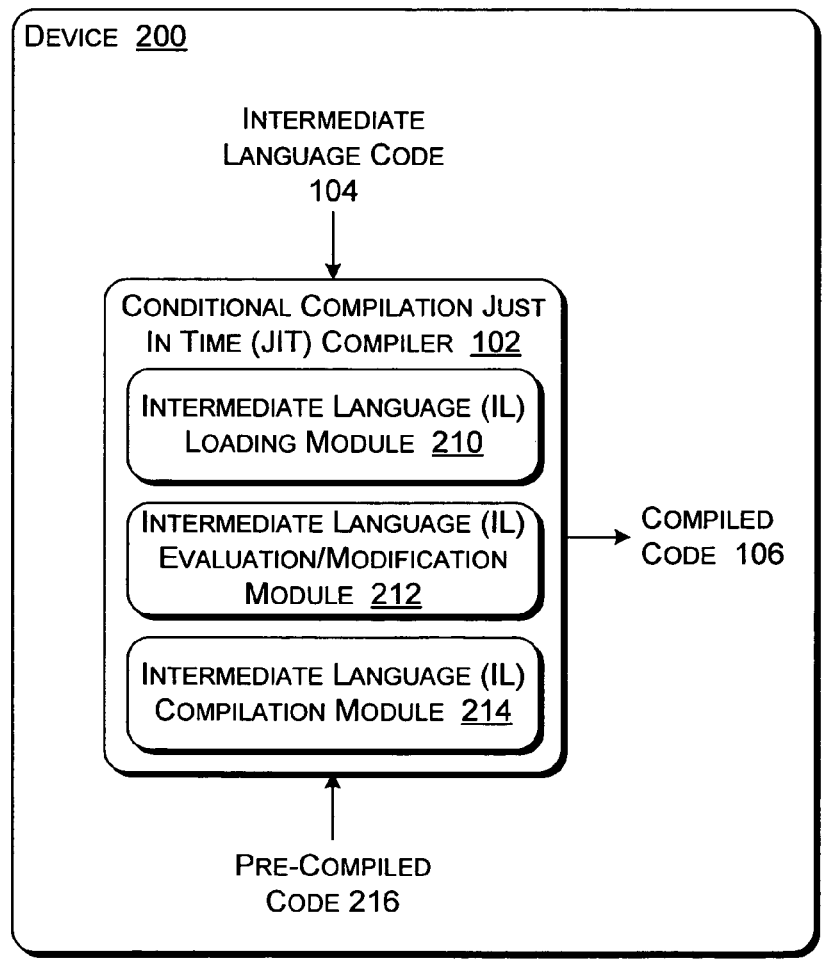
FIG. 2 illustrates an example conditional compilation just-in-time (JIT) compiler in additional detail.

FIG. 2 illustrates an example conditional compilation JIT compiler 102 in additional detail. Intermediate language code 104 is available at device 200 and is input to compiler 102. Intermediate language code 104 can be obtained from any of a variety of sources, such as an optical or magnetic disk, volatile or nonvolatile memory, from a remote device (e.g., over the Internet or other network), and so forth. One or more programs, or portions thereof, are run on device 200 by compiler 102 compiling IL code 104 and executing the resultant compiled code 106.

In certain embodiments, compiler 102 is included as part of the Common Language Runtime (CLR), which is part of the Microsoft® .NET Framework. Additional information regarding the CLR and the .NET Framework are available from Microsoft Corporation of Redmond, Washington. Alternatively, compiler 102 can be a different compiler that is not part of the Microsoft CLR.

A request can be made at device 200 to run intermediate language code 104. This request can be, for example, a request based on a user-input requesting to run code 104, a request from another program already running on device 200, a request from another device or component, and so forth. When a request to run intermediate language code 104 is received, IL loading module 210 retrieves IL code 104 to begin compiling code 104. The process of obtaining code 104 from whatever its source(s) is in order to begin compiling at least a portion of code 104 is referred to as loading code 104.

IL evaluation/modification module 212 evaluates IL code 104 and, based on the current environment of device 200, may modify one or more portions of IL code 104. IL code 104 contains certain programming variables that are marked as load-time constants. Each such variable specifies which parameter or setting of the device 200 should be used to initialize the value of the variable. These parameters or settings can thus be viewed as the current environment of device 200. These parameters or settings are obtained when loading of IL code 104 begins, and the same parameters or settings are used for the duration of the current compilation and running of IL code 104. It should be noted that a different loading, compiling, and running of IL code 104 could begin at a later time using different parameters or settings. This different loading, compiling, and running could begin after the current running of IL code 104 has stopped, or could be concurrent with the current running of IL code 104. In other words, two or more different processes running the same IL code but using different parameters or settings can be running concurrently.

The modification of IL code 104 can occur in different ways. For example, constants in IL code 104 can be replaced with their actual values, mathematical expressions in IL code 104 can be evaluated, parts of IL code 104 can be deleted and thus not compiled, and so forth. Such modifications of IL code 104 are discussed in more detail below.

The modified IL code is then just-in-time compiled by IL compilation module 214 and output as compiled code 106. Compiled code 106, also referred to as object code, can then be executed by device 200. As discussed above, compiled code 106 is generated and output on an as-needed basis when running code 104, rather than being pre-compiled in its entirety before being run.

It should be noted that pre-compiled code 216 may be generated and made available to compiler 102. Portions of IL code 104 can be pre-compiled and stored by device 200 as pre-compiled code 216 in order to decrease the amount of code 104 that compiler 102 needs to compile when code 104 is being run, and thus increase the performance of compiler 102. This pre-compiled code 216 is typically generated by compiler 102 before loading and running of code 104 begins, such as at the time code 104 is installed on device 200.

During operation, prior to compilation module 214 compiling a portion of code 104, compilation module 214 checks whether that portion of code 104 has been pre-compiled and is available as pre-compiled code 216. If that portion of code 104 has been pre-compiled, then compilation module 214 verifies that that portion of code 104 has not been changed since it was pre-compiled. Compilation module 214 also verifies that the environment of device 200 at the time the code was pre-compiled, including any parameters or settings associated with the load-time constants discussed above, is the same as the environment of device 200 at the current time that code 104 is being run. If the environments are the same, and that portion of code 104 has not been changed since it was pre-compiled, then the pre-compiled version can be used. However, if the environments are not the same, or that portion of code 104 has been changed since it was pre-compiled, then the pre-compiled version cannot be used and compilation module 214 just-in-time compiles that portion of code 104 (as modified by evaluation/modification module 212).

Figure 3:
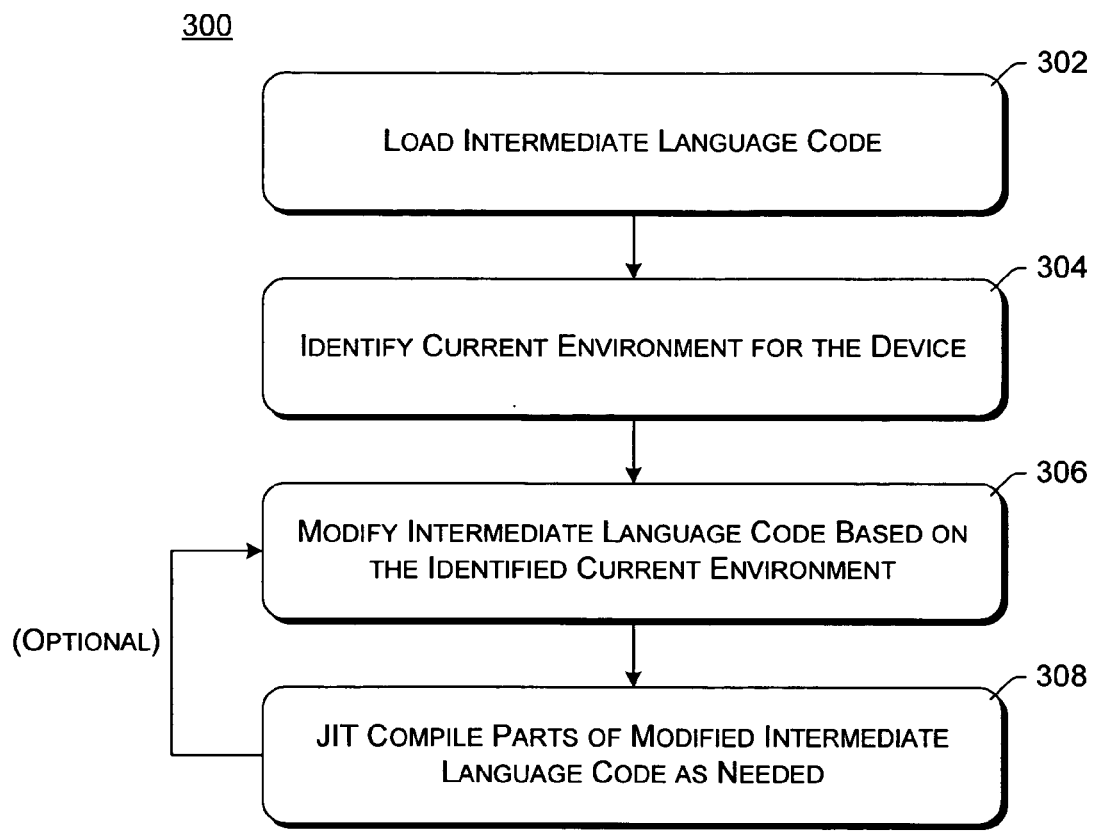
FIG. 3 is a flowchart illustrating an example process for conditional compilation of intermediate language code based on a current environment.

FIG. 3 is a flowchart illustrating an example process 300 for conditional compilation of intermediate language code based on a current environment. Process 300 is carried out by a conditional compilation JIT compiler, such as compiler 102 of FIGS. 1 and 2. Process 300 may be performed in software, firmware, hardware, or combinations thereof.

Initially, the IL code is loaded (act 302). The IL code is loaded so that compilation of the code can begin. This loading typically involves copying at least a portion of the IL code from its source into a random access memory (e.g., which may include physical memory and/or virtual memory) of the device that includes the compiler. The loading does not necessarily require that all of IL code 104 be initially copied into a random access memory. Rather, depending on the size and nature of code 104, some of code 104 may be initially copied into a random access memory and then additional portions copied as needed.

The current environment of the device is also identified (act 304). This device is, for example, device 200 of FIG. 2. The identification in act 304 occurs when loading of IL code 104 begins (e.g., just prior to, or concurrent with, the copying of the first portion of IL code 104 into random access memory). Alternatively, the identification in act 304 may occur at other times prior to compilation of the first portion of IL code 104 being compiled (e.g., by compilation module 214).

The current environment is described by one or more parameters or settings of the device. These parameters or settings may be passed to the compiler (e.g., passed by the operating system when the request to run IL code 104 is sent to the compiler) or they may be retrieved by the compiler. For example, the settings or parameters may come from a known location (e.g., a particular file on the device), from a repository for registration information (such as the Registry in Windows® operating systems), from Environment Variables (as available in Windows® operating systems and UNIX operating systems), from a database entry, from hardware registers, and so forth.

The settings or parameters identify characteristics of the current environment at the time IL code 104 is loaded. Any of a variety of information can be included in these settings or parameters. Examples of such settings or parameters include an indication of whether the device is currently in a debug mode, an indication of which of multiple debug modes the device is currently in, an indication of a particular size or capability of the device or portion of the device, and so forth. Device capabilities include values such as the amount of physical random access memory that is in the device, a speed of a processor in the device, whether the device is connected to a network, how fast the connection to the network is, a resolution setting for a display screen of the device, and so forth.

The IL code is then modified based on the identified current environment (act 306). The nature of this modification can vary, based on the current environment as well as the IL code. Specific values for the current environment can be used to replace load-time constants in the IL code. For example, a load-time constant "debug" may be set to a value of "true" if the device is in a debug mode, or set to a value of "false" if the device is not in a debug mode. By way of another example, a load-time constant of "size" may be set to the value to be used for that size.

Once the constant value(s) are set, additional modifications to the IL code can be made. The exact nature of these modifications can vary, based on the IL code as well as the constant value(s). For example, if a mathematical expression includes the load-time constant, then after that constant is replaced with its specific value, the expression can be evaluated. E.g., if the IL code has a mathematical expression of "size*5+21", and "size" is a load-time constant having a value of "100", then "size" can be replaced with "100" and the mathematical expression can be evaluated to "521".

By way of another example, an if-then-else statement may be based on a load-time constant of "debug" so that the "then" branch is taken if "debug" is evaluated to true, and the "else" branch is taken if "debug" is evaluated to false. The "debug" load-time constant can be replaced with its specific value (e.g., "true" or "false"), and then the IL code modified to include only the appropriate branch. For example, if the "debug" load-time constant has a value of "true", then the IL code can be modified to delete the "else" branch of the if-then-else statement but keep the "then" branch of the if-then-else statement. The "else" branch can be deleted because the value of the load-time constant "debug" is known to be "true", so the "else" branch will not be used. The IL code can be further modified to delete the if statement itself (referring to the conditional statement of, for example, "if debug then"), leaving only the code that is part of the "then" branch. The if statement itself can be deleted because the load-time constant "debug" is known to be "true"—the statement need not be subsequently evaluated because the value of the load-time constant "debug" is known. This can increase the speed at which the compiled code can be run because the compiled code will not include the if statement and thus no processing power is expended on evaluating the if statement when running the compiled code.

This example can be illustrated using pseudo code. Assume that the IL code includes the code in Table I. Further assume that "debug" is a load-time constant set to the value of "true". The IL code of Table I can be modified to keep the "then" branch, which is the "writeline ("Debug mode is on.");" instruction, while deleting the else branch as well as the if statement itself. The result of the modification is the code in Table II.

TABLE I

```
if debug then
    {
        writeline ("Debug mode is on.");
    }
    else
    {
        writeline ("Debug mode is off.");
    };
```

TABLE II

```
writeline ("Debug mode is on.");
```

By way of yet another example, three or more different branches may be selected from in a similar manner to the if-then-else statement discussed in the previous example. Multiple if-then-else statements may be nested together, or another mechanism (such as a "case" statement) may be used to select one of the three or more different branches. In this example, only the branch that is selected, given the value of the load-time constant, is compiled. The remaining branches can simply be deleted, as can the if-then-else, case, or other statement that was used to select the branch.

The different instructions that can be included in the different branches can vary based on the desires of the developer of the IL code. For example, different tests may be performed, different information may be logged or recorded, information may be reported in different manners (e.g., to a logging file, transmitted to a remote location over a network, printed on a printer, etc.), different interfaces may be displayed to the user, different functionality may be made available to the user, and so forth.

Once the code is modified, the portions of the modified IL code are just-in-time compiled as needed (act 308). Optionally, a check may be made as to whether the portions have already been pre-compiled, and the pre-compiled versions used as discussed above rather than compiling the functions in act 308.

Act 306 may optionally be repeated. In certain embodiments, portions of the IL code are modified in act 306 as they are needed, analogous to those portions of the IL code being compiled in act 308 as they are needed. In alternate embodiments, an initial pass over the IL code can be made in act 306, during which the IL code is modified without regard for whether the particular portions being modified are currently needed to be JIT compiled in act 308. Then, as the portions are needed, the portions (already having been modified) are JIT compiled in act 308.

The load-time constants within IL code can be identified in different ways. In certain implementations, load-time specific instructions are included in the IL and are understood by JIT compiler 102. These new instructions, and associated new opcodes, are understood by JIT compiler 102 as being related to load-time constants, and these instructions would be evaluated based on the current environment as discussed above. In this implementation, the component (not shown) that generates IL code 104 also understands these load-time specific instructions, and understands how to generate the IL including these load-time specific instructions.

In other implementations, rather than using different instructions and/or opcodes, a custom attribute can be defined for a variable. Many languages currently support the idea of a custom attribute, which is information associated with a variable that describes an aspect(s) of that variable. As the name implies, these attributes can be customized by individual developers, allowing virtually any type of information to be associated with a variable. An additional custom attribute is defined that indicates that the variable is a load-time constant, as well as which particular parameter(s) or setting(s) of the current environment should be used to initialize its value. In this implementation, the JIT compiler 102 understands the load-time constant custom attribute and can identify those variables that are load-time constants. However, the component (not shown) that generates IL code 104 need not be aware of load-time constants; rather such a component would simply treat the custom attribute identifying a variable as a load-time constant in the same way that it treats any other variable with a custom attribute. Furthermore, any system that has no knowledge of load-time constants can still compile and execute the IL code 104, although without the performance benefits and configurability benefits discussed herein, having some default assignment of the load-time constants chosen by the developer of IL code 104.

Thus, as discussed above, the compilation of the IL code is conditional—load-time constants can be replaced with their actual values, mathematical expressions employing these load-time constants can be evaluated, certain portions of the IL code can be deleted, and so forth. All of these modifications are based on the current environment of the device, rather than by a developer prior to distribution of the IL code. Thus, the same IL code can result in different compiled code for different environments. For example, in FIG. 2 additional instructions related to debugging of a program or diagnostics regarding a program can be included in IL code 104, and those instructions would be included in the compiled code 106 only if the current environment indicated that the system was in a debug mode. A conditional expression with a load-time constant(s) can be included in IL code 104 and the load-time constants can be replaced with their actual values. If it is then possible to fully evaluate the conditional expression to true, then the conditional expression can be removed from the IL code as well as any instructions in a false branch, and only the instructions in the true branch are left in the IL code. Similarly, if it is possible to fully evaluate the conditional expression to false, then the conditional expression can be removed from the IL code as well as any instructions in a true branch, and only the instructions in the false branch are left in the IL code. If it is not possible to fully evaluate the conditional expression to true or false, then the conditional expression (having its load-time constants replaced with actual values) is left in the IL code along with the instructions for both the true and false branches.

The conditional compilation of the IL code allows the same IL code to be distributed to multiple different users, yet have additional functionality (e.g., debugging or diagnostic functionality) included in the compiled versions only for those users that want it, and can further be included only when those users want it. Thus, if such additional functionality reduces the performance of the code when running, users that do not currently want that functionality need not incur the performance cost of having that functionality, nor the performance cost of repeatedly testing if the functionality is desired when executing the compiled code.

The current environment can vary across different devices, and can also vary across different times on the same device. For example, a developer may have different diagnostic information that he or she is interested in at different times, and can change the current environment to allow this different diagnostic information to be provided by the device (e.g., a "DiagnosticLevel" load-time constant can be defined with two or more different possible values, each of these values corresponding to a different type and/or amount of diagnostic information to be provided by the device while the compiled code is running). By way of another example, a user may begin running the code with a current environment that provides no diagnostic information. If the user encounters problems and calls a customer support line, a technician over the phone can instruct the user to change the current environment (optionally including instructing the user how to change the current environment) to an environment that provides additional diagnostic information and begin running the code again. With this new current environment, the additional diagnostic information is now available to the user and/or technician (e.g., the diagnostic information may be sent by the device over the Internet to a device local to the technician). Once the problem has been resolved, the current environment can be changed back to an environment that provides no diagnostic information.

In the discussion of FIG. 3 above, the current environment is discussed as being identified once when loading of the IL code begins. In alternate embodiments, the current environment may be identified at different points, allowing the current environment to be changed at different times during compilation of the IL code. In such situations, if the current environment is changed, the new current environment would be reflected only in the code that is compiled after the current environment is changed; any code previously compiled based on a previous current environment would still be based on that same previous current environment. In such situations, the developer of the IL code should take care to account for these changes in values of load-time constants that may occur during running of the IL code. Alternatively, any code previously compiled may be re-compiled whenever the current environment is changed.

It should be noted that the conditional compilation discussed herein allows for different code to be selected for compilation, and allows load-time constants to be replaced with their actual values based on the current environment. The types of arguments and/or parameters that different functions have, as well as the number of arguments and/or parameters that different functions have, is not altered. This allows, for example, developers and other users of code libraries to write against a known set of functions.

It should be noted that, although the acts 302, 304, 306, and 308 of FIG. 3 are illustrated as separate blocks in FIG. 3, one or more of these acts can be performed concurrently, a piece of one or more of these acts can be performed concurrently with a piece or all of another act, one or more of the acts may be performed consecutively, and so forth.

Figure 4:
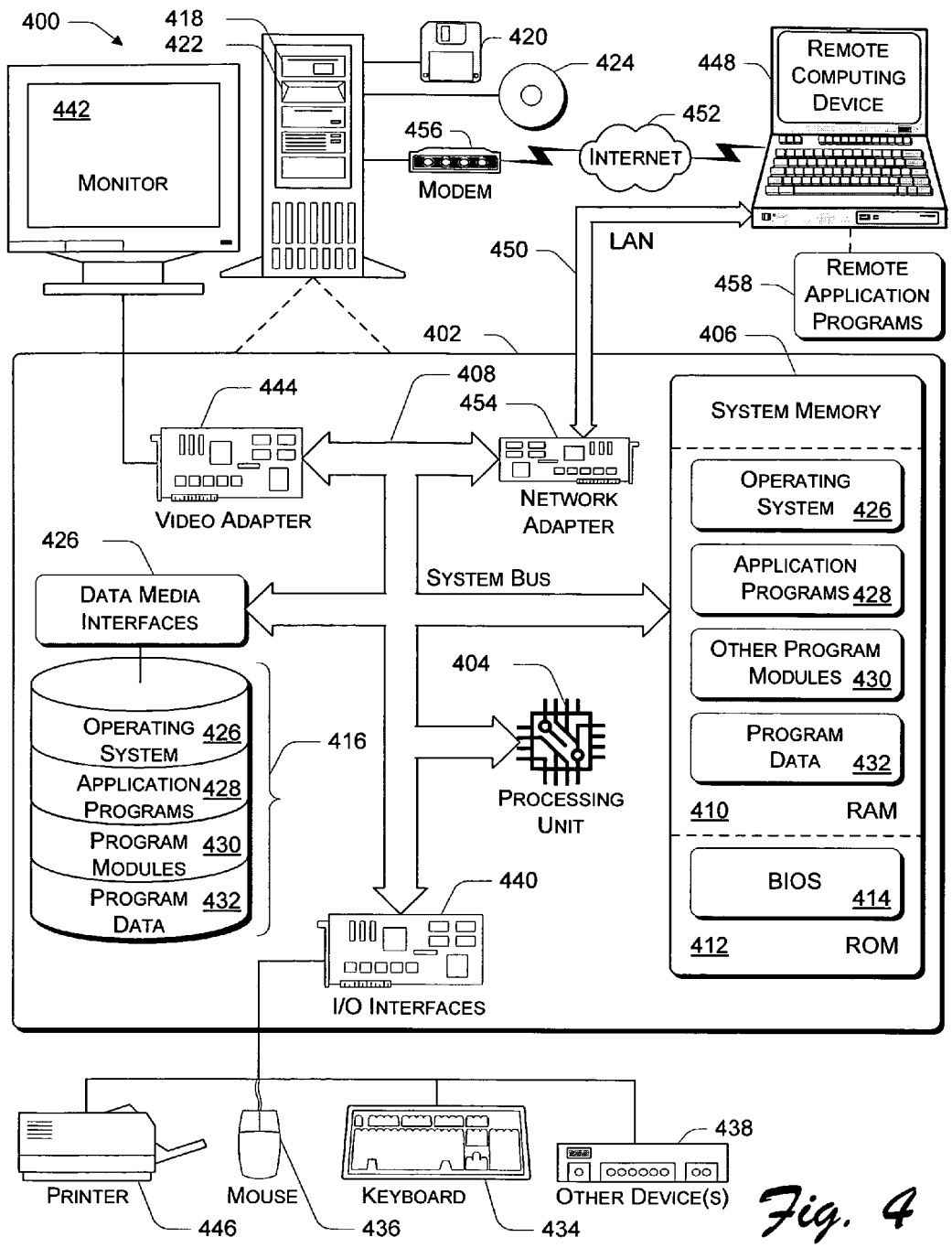
FIG. 4 illustrates a general computer system, which can be used to implement the conditional compilation of intermediate language code based on current environment described herein.

FIG. 4 illustrates a general computer system 400, which can be used to implement the conditional compilation of intermediate language code based on current environment described herein. The computer system 400 is only one example of a computing system and is not intended to suggest any limitation as to the scope of use or functionality of the computer and network architectures. Neither should the computer system 400 be interpreted as having any dependency or requirement relating to any one or combination of components illustrated in the exemplary computer system 400.

Computer system 400 includes a general-purpose computing device in the form of a computer 402. Computer 402 can be, for example, a device 200 of FIG. 2, or a device on which compiler 102 of FIG. 1 can be implemented. The components of computer 402 can include, but are not limited to, one or more processors or processing units 404, a system memory 406, and a system bus 408 that couples various system components including the processor 404 to the system memory 406.

The system bus 408 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 402 typically includes a variety of computer readable media. Such media can be any available media that is accessible by computer 402 and includes both volatile and non-volatile media, removable and non-removable media.

The system memory 406 includes computer readable media in the form of volatile memory, such as random access memory (RAM) 410, and/or non-volatile memory, such as read only memory (ROM) 412. A basic input/output system (BIOS) 414, containing the basic routines that help to transfer information between elements within computer 402, such as during start-up, is stored in ROM 412. RAM 410 typically contains data and/or program modules that are immediately accessible to and/or presently operated on by the processing unit 404.

Computer 402 may also include other removable/non-removable, volatile/non-volatile computer storage media. By way of example, FIG. 4 illustrates a hard disk drive 416 for reading from and writing to a non-removable, non-volatile magnetic media (not shown), a magnetic disk drive 432 for reading from and writing to a removable, non-volatile magnetic disk 420 (e.g., a "floppy disk"), and an optical disk drive 422 for reading from and/or writing to a removable, non-volatile optical disk 424 such as a CD-ROM, DVD-ROM, or other optical media. The hard disk drive 416, magnetic disk drive 432, and optical disk drive 422 are each connected to the system bus 408 by one or more data media interfaces 426. Alternatively, the hard disk drive 416, magnetic disk drive 432, and optical disk drive 422 can be connected to the system bus 408 by one or more interfaces (not shown).

The disk drives and their associated computer-readable media provide non-volatile storage of computer readable instructions, data structures, program modules, and other data for computer 402. Although the example illustrates a hard disk 416, a removable magnetic disk 420, and a removable optical disk 424, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system.

Any number of program modules can be stored on the hard disk 416, magnetic disk 420, optical disk 424, ROM 412, and/or RAM 410, including by way of example, an operating system 426, one or more application programs 428, other program modules 430, and program data 432.

A user can enter commands and information into computer 402 via input devices such as a keyboard 434 and a pointing device 436 (e.g., a "mouse"). Other input devices 438 (not shown specifically) may include a microphone, joystick, game pad, satellite dish, serial port, scanner, and/or the like. These and other input devices are connected to the processing unit 404 via input/output interfaces 440 that are coupled to the system bus 408, but may be connected by other interface and bus structures, such as a parallel port, game port, or a universal serial bus (USB).

A monitor 442 or other type of display device can also be connected to the system bus 408 via an interface, such as a video adapter 444. In addition to the monitor 442, other output peripheral devices can include components such as speakers (not shown) and a printer 446 which can be connected to computer 402 via the input/output interfaces 440.

Computer 402 can operate in a networked system using logical connections to one or more remote computers, such as a remote computing device 448. By way of example, the remote computing device 448 can be a personal computer, portable computer, a server, a router, a network computer, a peer device or other common network node, and the like. The remote computing device 448 is illustrated as a portable computer that can include many or all of the elements and features described herein relative to computer 402.

Logical connections between computer 402 and the remote computer 448 are depicted as a local area network (LAN) 450 and a general wide area network (WAN) 452. Such networking systems are commonplace in offices, enterprise-wide computer networks, intranets, and the Internet.

When implemented in a LAN networking system, the computer 402 is connected to a local network 450 via a network interface or adapter 454. When implemented in a WAN networking system, the computer 402 typically includes a modem 456 or other means for establishing communications over the wide network 452. The modem 456, which can be internal or external to computer 402, can be connected to the system bus 408 via the input/output interfaces 440 or other appropriate mechanisms. It is to be appreciated that the illustrated network connections are exemplary and that other means of establishing communication link(s) between the computers 402 and 448 can be employed.

In a networked system, such as that illustrated with computing system 400, program modules depicted relative to the computer 402, or portions thereof, may be stored in a remote memory storage device. By way of example, remote application programs 458 reside on a memory device of remote computer 448. For purposes of illustration, application programs and other executable program components such as the operating system are illustrated herein as discrete blocks, although it is recognized that such programs and components reside at various times in different storage components of the computing device 402, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method implemented in a device, the method comprising:
    loading intermediate language code;
    identifying a current environment of the device, wherein the current environment includes parameters or settings that are conditionally compiled in the intermediate language code for the device;
    modifying the intermediate language code based on the current environment, wherein the intermediate language code has marked load-time constraints;
    just-in-time compiling portions of the modified intermediate language code as needed when running the intermediate language code; and
    beginning a second operation for loading, modifying, and compiling the intermediate language code using different parameters or settings.

2. A method as recited in claim 1, wherein one or more of the loading, identifying, modifying, and just-in-time compiling are performed consecutively.

3. A method as recited in claim 1, wherein one or more of the loading, identifying, modifying, and just-in-time compiling are performed concurrently.

4. A method as recited in claim 1, wherein a piece of one or more of the loading, identifying, modifying, and just-in-time compiling is performed consecutively with at least a piece of another one or more of the loading, identifying, modifying, and just-in-time compiling.

5. A method as recited in claim 1, further comprising performing the modifying for a function of the intermediate language code when compilation of the function is needed.

6. A method as recited in claim 1, further comprising performing the modifying for all of the intermediate language code prior to just-in-time compiling any portion of the modified intermediate language code.

7. A method as recited in claim 1, wherein the current environment indicates whether the intermediate language code is being run in a debug mode, wherein parameters or settings indicate the intermediate language code is in the debug mode and which of the multiple debug modes.

8. A method as recited in claim 1, wherein the current environment indicates which of a plurality of debug modes the intermediate language code is being run in.

9. A method as recited in claim 1, wherein the modifying comprises deleting one or more parts of the intermediate language code.

10. A method as recited in claim 9, wherein the deleted one or more parts comprise both one branch of an if statement and the if statement, but excludes another branch of the if statement.

11. A method as recited in claim 1, wherein the current environment is indicated by constant values for one or more load-time constants.

12. A method as recited in claim 11, wherein the modifying comprises substituting the constant values for one or more load-time constants in the intermediate language code.

13. A method as recited in claim 12, wherein the modifying further comprises evaluating, after the substituting, one or more mathematical expressions that include at least one of the constant values, the one or more mathematical expressions being part of the intermediate language code.

14. A method as recited in claim 1, further comprising:
    checking, prior to just-in-time compiling one of the portions of the modified intermediate language code, whether the one portion has been pre-compiled;
    checking, if the one portion has been pre-compiled, whether the current environment of the device is the same as an environment of the device when the portion was pre-compiled; and
    using the pre-compiled portion rather than just-in-time compiling the portion only if the current environment of the device is the same as the environment of the device when the portion was pre-compiled.

15. One or more computer readable storage media having stored thereon a plurality of instructions that, when executed by one or more processors of a device, causes the one or more processors to:
    load intermediate language code; and
    identify a current environment of the device, wherein the current environment includes parameters or settings that are conditionally compiled in the intermediate language code for the device;

modify the intermediate language code based on the current environment, wherein the intermediate language code has marked load-time constraints;

conditionally just-in-time compile portions of the intermediate language code based on a current environment of the device; and begin a second operation for loading, modifying, and compiling the intermediate language code using different parameters or settings.

16. One or more computer readable storage media as recited in claim 15, wherein the plurality of instructions further causes the one or more processors to modify a portion of the intermediate language code when compilation of the portion is needed.

17. One or more computer readable storage media as recited in claim 15, wherein the current environment indicates which of a plurality of debug modes the intermediate language code is being run in.

18. One or more computer readable storage media as recited in claim 15, wherein to conditionally just-in-time compile portions of the intermediate language code is to delete one or more parts of the intermediate language code.

19. One or more computer readable storage media as recited in claim 18, wherein the deleted one or more parts comprise a branch of an if statement.

20. One or more computer readable storage media as recited in claim 15, wherein to conditionally just-in-time compile portions of the intermediate language code is to substitute a constant value for a load-time constant in the intermediate language code.

21. One or more computer readable storage media as recited in claim 20, wherein to conditionally just-in-time compile portions of the intermediate language code is to evaluate, after the substitution, one or more mathematical expressions that include the constant value, the one or more mathematical expressions being part of the intermediate language code.

22. A system comprising:
memory;
a processor coupled to the memory in operation with modules:
a loading module configured to load intermediate language code;
identifying a current environment of the device, wherein the current environment includes parameters or settings that are conditionally compiled in the intermediate language code for the device;
a modification module to modify the intermediate language code based on current values of one or more load-time constants of the intermediate language code;
a compilation module to just-in-time compile the modified intermediate language code; and
a second operation to load, modify, and compile the intermediate language code using different parameters or settings.

23. A system as recited in claim 22, wherein the current values indicate which of a plurality of debug modes the system is in.

24. A system as recited in claim 22, wherein the modification module is to modify the intermediate language code by deleting one or more parts of the intermediate language code.

25. A system as recited in claim 24, wherein the deleted one or more parts comprise a branch of an if statement.

26. A system as recited in claim 22, wherein the modification module is to modify the intermediate language code by substituting the current values for the one or more load-time constants.

27. A system as recited in claim 26, wherein to conditionally just-in-time compile the intermediate language code is to evaluate, after the substituting, one or more mathematical expressions that include the current values, the one or more mathematical expressions being part of the intermediate language code.

28. A system comprising:
memory;
processor coupled to the memory;
means for loading an intermediate language code; and
means for identifying a current environment of a device, wherein the current environment includes parameters or settings that are conditionally compiled in the intermediate language code for the device;
means for modifying the intermediate language code based on the current environment, wherein the intermediate language code has marked load-time constraints;
means for conditionally just-in-time compiling the intermediate language code based on a current environment of the system; and
means for beginning a second operation for loading, modifying, and compiling the intermediate language code using different parameters or settings.

29. A system as recited in claim 28, wherein the current environment indicates which of a plurality of debug modes the intermediate language code is being run in.

30. A system as recited in claim 28, wherein the means for conditionally just-in-time compiling the intermediate language code comprises means for deleting one or more parts of the intermediate language code.

31. A system as recited in claim 30, wherein the deleted one or more parts comprise a branch of an if statement.

32. A system as recited in claim 28, wherein the means for conditionally just-in-time compiling the intermediate language code comprises means for substituting a constant value for at least one load-time constant corresponding to the current environment.

33. A system as recited in claim 32, wherein the means for conditionally just-in-time compiling portions of the intermediate language code comprises means for evaluating, after the substitution, one or more mathematical expressions that include the constant value, the one or more mathematical expressions being part of the intermediate language code.

* * * * *